May 22, 1956 J. SELBY 2,747,150
ELECTRIC CONTROL FOR MACHINE TOOLS
Filed May 2, 1952 7 Sheets-Sheet 1

JAMES SELBY
INVENTOR

BY Eugene E. Stevens
His ATTORNEY

May 22, 1956  J. SELBY  2,747,150
ELECTRIC CONTROL FOR MACHINE TOOLS
Filed May 2, 1952  7 Sheets-Sheet 3

JAMES SELBY
INVENTOR

BY Eugene E. Stevens
His ATTORNEY

May 22, 1956  J. SELBY  2,747,150
ELECTRIC CONTROL FOR MACHINE TOOLS
Filed May 2, 1952  7 Sheets-Sheet 5

JAMES SELBY
INVENTOR
BY Eugene E. Stevens
His ATTORNEY

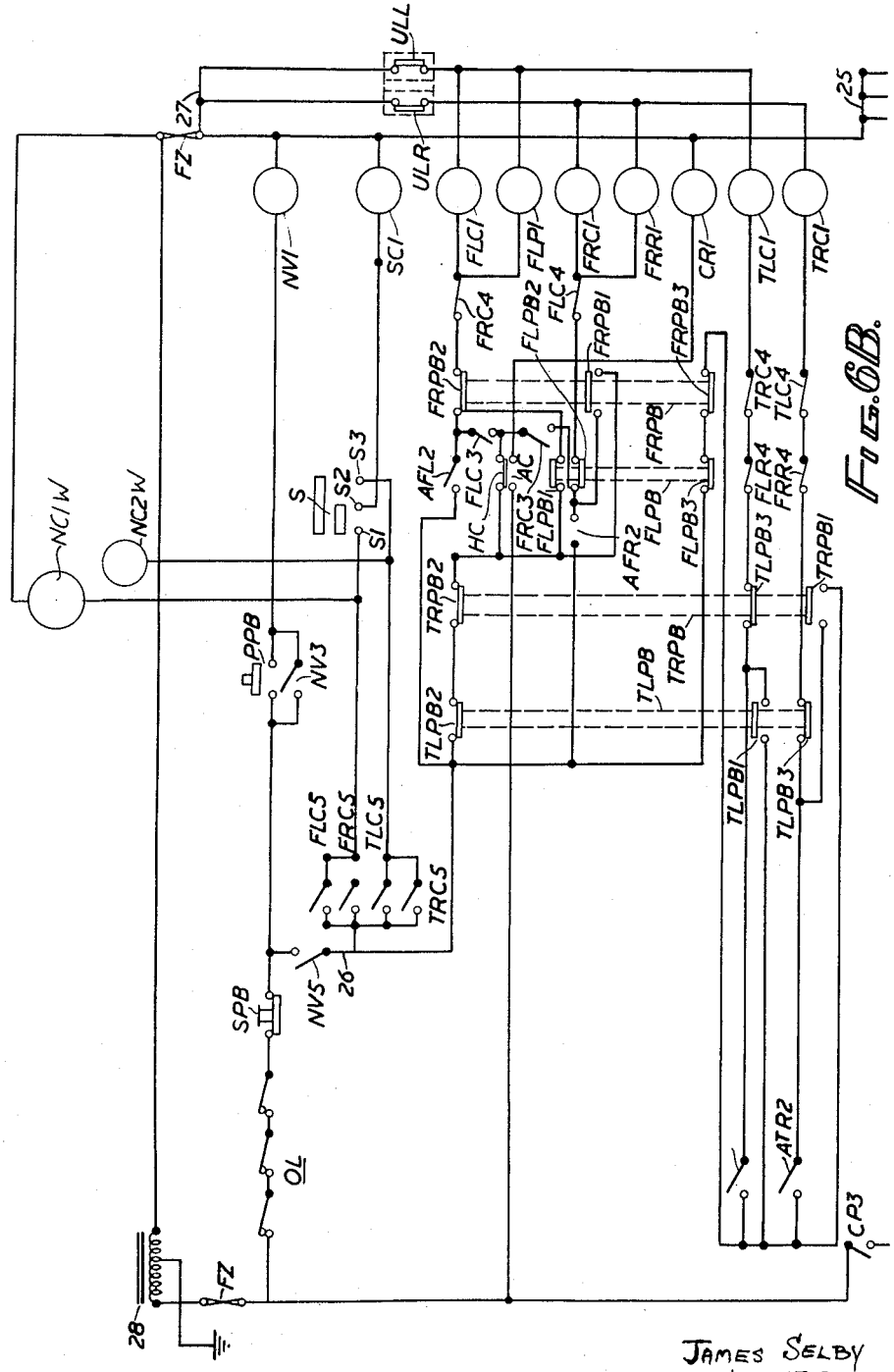

United States Patent Office 2,747,150
Patented May 22, 1956

2,747,150

ELECTRIC CONTROL FOR MACHINE TOOLS

James Selby, Hatch End, England, assignor to Victoria Machine Tool Company Limited, London, England, a British company Application May 2, 1952, Serial No. 285,723

Claims priority, application Great Britain May 2, 1951

9 Claims. (Cl. 318—103)

This invention relates to electric circuit controlling apparatus, and refers particularly, but not exclusively, to electric circuit controlling apparatus for effecting selected cycles of movements of the work tables of machine tools such as milling machine. As is well known it is frequently required to give such work tables a selected cycle of movements, for example a feed-left movement, a feed-right movement, a quick-travel-left movement, and a quick-travel-right movement, and it may be required to change from any of said movements to any other at any preselected position of the table.

The object of the invention is the provision of improvements in such apparatus by which among other advantages increased simplicity and cheapness will be obtained.

The invention consists broadly of an electrical control apparatus for automatically effecting selected cycles of movement of a driven device, such as the work table of a machine tool, which travels in reverse directions in a given path, comprising five switches mounted adjacent to said driven device and five corresponding dogs mounted on said driven device, the positions of said switches and dogs being such that, during travel of said driven device each dog can engage its corresponding switch but not any of the other switches, each dog, by engaging its corresponding switch actuating the same from its normal to its operative position when travelling in one direction but not when travelling in the other direction, and said switches comprising feed-left, feed-right, quick-travel-left and quick-travel-right switches, which, when momentarily actuated to their operative positions, establish electric motor connections for respectively driving said driven device slowly to the left, slowly to the right, quickly to the left and quickly to the right, and a stop switch which when momentarily actuated to its operative position interrupts electric motor connections thereby causing said driven device to stop.

In order that the invention may be the more clearly understood, an apparatus in accordance therewith, for selecting selected cycles of movements of work tables of machine tools such as milling machines, will now be described reference being made to the accompanying drawings wherein.

Figure 6A:
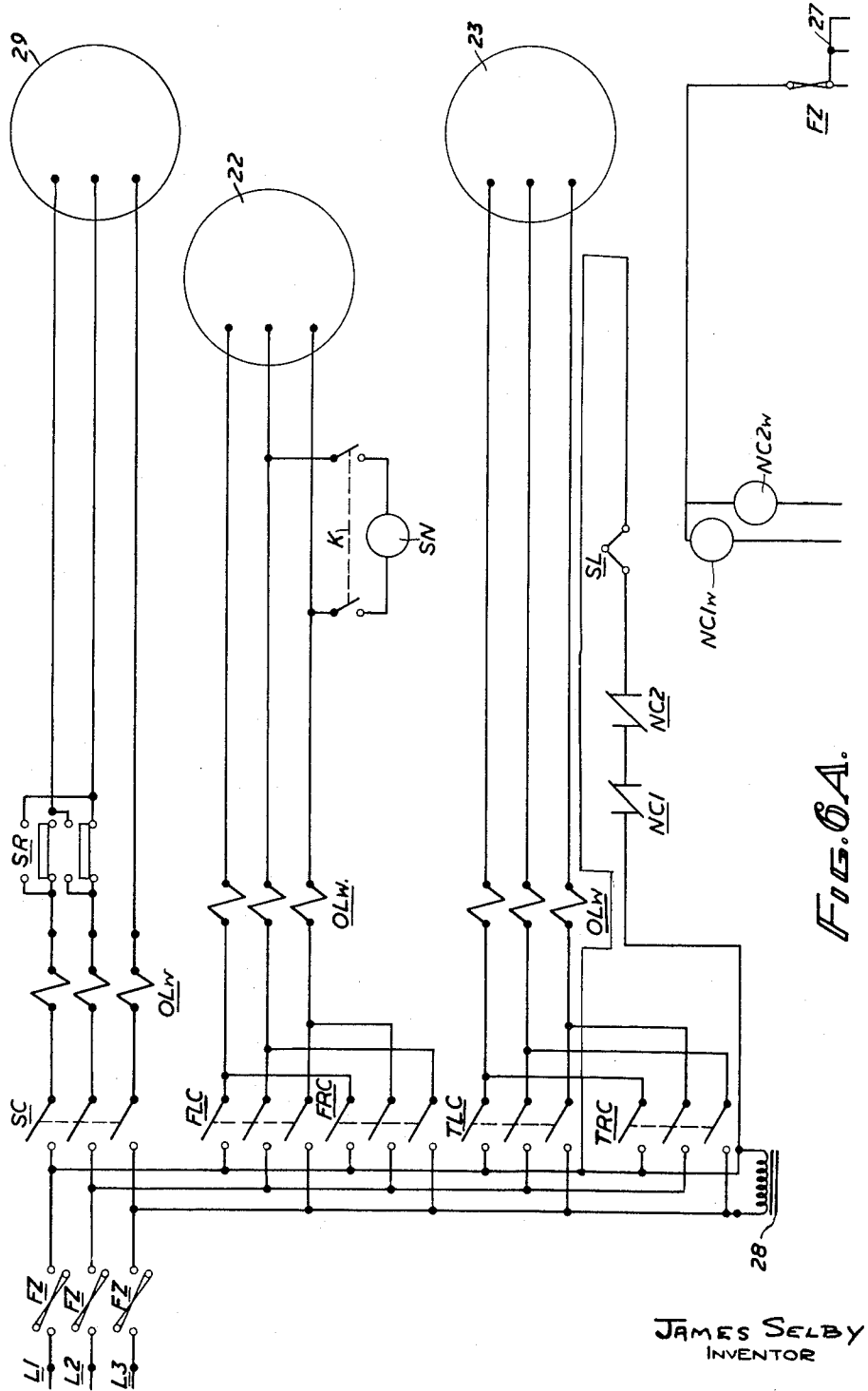
Figure 6C:
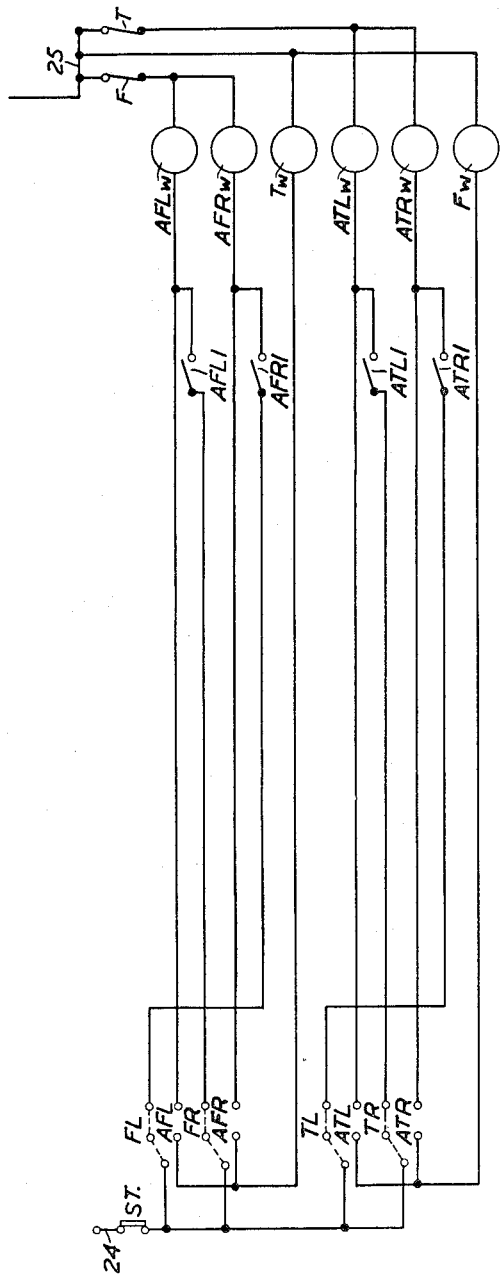

Figures 6A, 6B and 6C added together constitute a diagram of the circuit connections of the apparatus.

Figure 1:
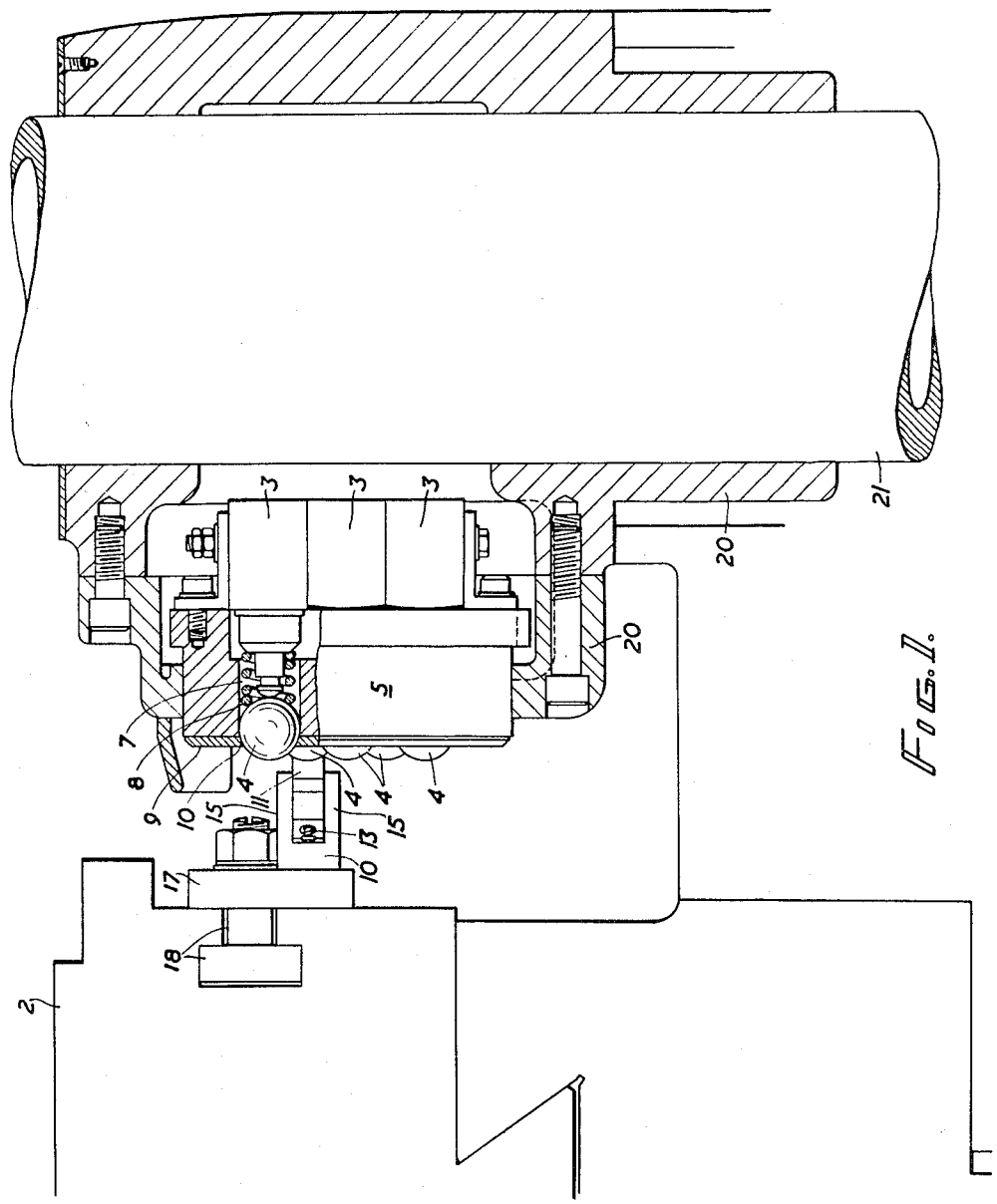
Figure 1 is a sectional elevation crosswise to the direction of movement of the work table, of a dog carried by the work table and control switches carried by an adjacent fixed structure.
Figure 2:
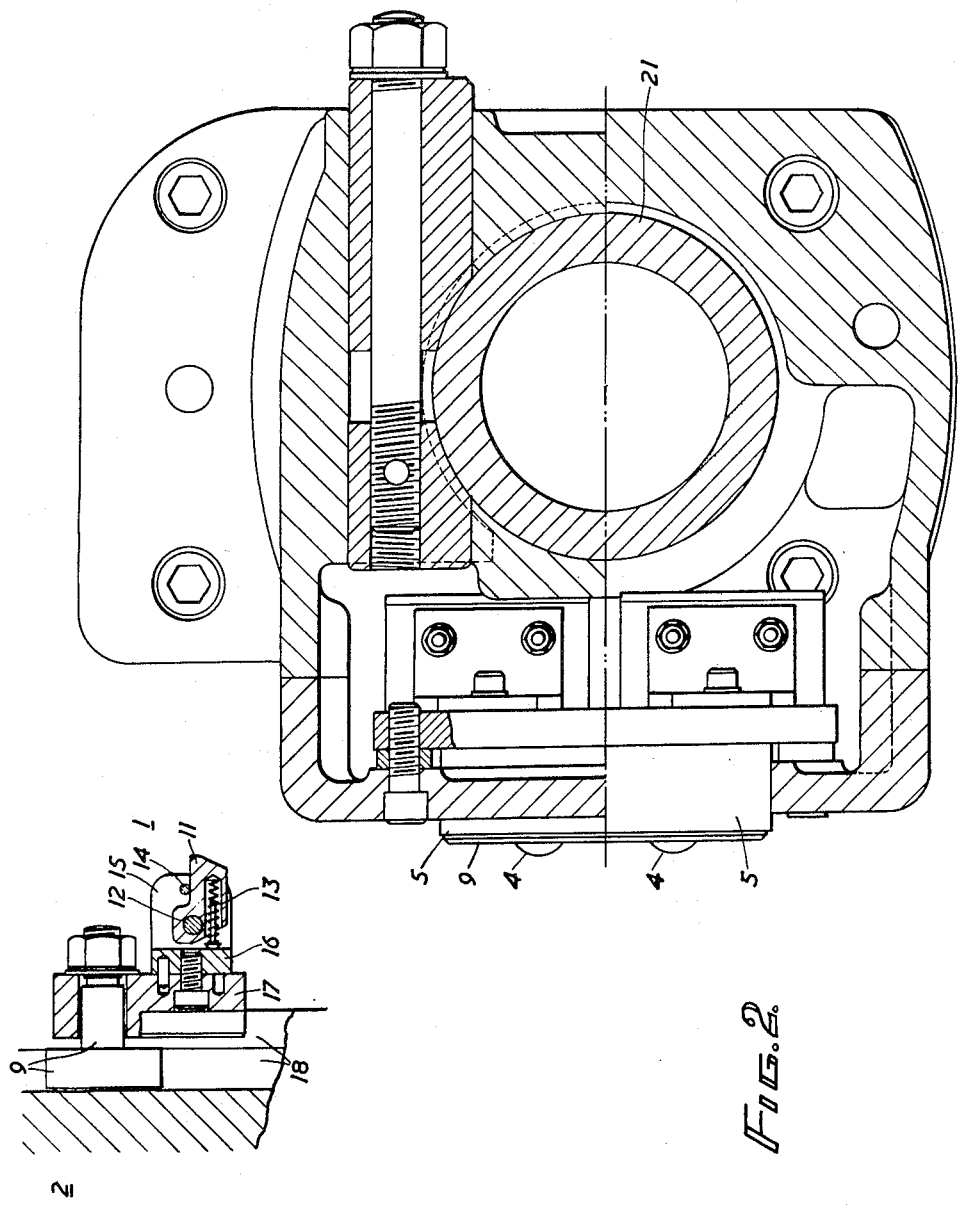
Figure 2 is a sectional plan of the same taken on line II—II of Figure 3.

Referring to the drawings, a number of dogs 1, one of which is shown in Figures 1 and 2, are carried by the work table 2 and a corresponding number of electric switches 3 are carried by an adjacent fixed structure. The dogs 1 are mounted at slightly different levels, and the switches 3 have actuating elements 4 which are respectively at the same levels as the dogs and so that each dog engages its own corresponding switch actuating element at a given position of the work table 2 and cannot engage any other actuating element. Thus, as the table 2 moves the dogs 1 successively engage their own respective switch actuating elements 4 and thereby, by a cam action, they depress said switch-actuating elements in opposition to spring bias, and this moves the respective switches 3 from their normal to their operating positions. Each dog 1 is capable of depressing its respective switch-actuating element 4 when the table 2 is moving in one direction only. When the dog 1 engages the switch-actuating element 4 with the table 2 moving in the other direction, said dog is capable of yielding pivotally so that it rides past the switch-actuating element without depressing it.

As will hereinafter appear, according to which switch 3 is actuated to its operating position, electric circuit connections are established to initiate a given rate and direction of travel of the table 2 or to stop said table. In the arrangement being described there are five dogs 1 and five switches 3; viz. a "stop" dog and a "stop" switch, a feed-left dog and a feed-left switch, a feed-right dog and a feed-right switch, a quick-travel-left dog and a quick-travel-left switch, and a quick-travel-right dog and a quick-travel-right switch. When the stop switch is actuated to its operating position, the table is stopped. When any of the other switches is momentarily actuated to its operating position, corresponding movement of the table (i. e. feed-left, feed-right, quick-travel-left or quick-travel-right) is initiated and continues until the next switch is momentarily actuated to its operating position. Each of the dogs 1 can be adjusted horizontally along the table 2 to any position, and can be arranged either way round, so that the direction of movement of the table at which said dog is operative can be selected. It will be seen that by selecting the required dogs and locating them at the required positions and the required way round any cycle of movements can be preselected.

Describing now certain of the features of the dogs 1 and switches 3, the switches are of the plunger-actuated type and they are all secured to one vertical face (hereinafter termed the inner face) of a fixed carrier block 5 with their plungers 6 projecting horizontally into respective holes 7 which pass through said carrier block to the opposite vertical face, hereinafter termed the outer face. Fitted within these holes 7 are respective balls constituting the actuating elements 4. Said balls 4 are biased outwardly by means of respective coil springs 8 in the holes 7 but they are retained in the holes by means of a cover plate 9 secured flush to the outer face of the carrier block 5. Said cover plate 9 has holes 10 through it which register with the holes 7 in the carrier block and are of such a size as to allow the balls 4 to project through them while being unable to pass completely through them. The plungers 6 of the switches 3 are outwardly biased to the normal position of the switches, and at this position said plungers just engage the respective balls 4.

The dogs 1 are mounted on a vertical face of the table 2 which faces the outer face of the carrier block 5. The operative part of each dog consists of a pawl 11 which projects horizontally from the table 2 at the same level as the centre of the ball 4 of the corresponding switch 3. The outermost end of said pawl 11 is bevelled as shown so that, when the table 2 is moving in the direction in which operation by said dog of the respective switch is required, the bevelled end, when it engages the respective ball 4 presses it inwards by a cam action and causes it to press the plunger 6 of the respective switch 3 inwards and actuate said switch to the operating position. When the pawl 11 engages its ball 4 with the table 2 moving in the other direction said pawl 11 pivots about a pivot pin 12 in opposition to the bias of a light spring 13 so as to ride past the ball without depressing it. It will be understood that the light biasing spring 13 normally holds the pawl 11 at its operative position against a stop 14, so that said pawl can only tilt in the one direction.

The support on which the pawl 11 is pivotally mounted, is a bracket consisting of two parallel plates 15 extending from a base 16, the pivot pin 12 and stop 14 being mounted between said plates 15. The bracket is mounted on a sliding block 17 which, in turn is mounted on the face of the work table 2 so as to be slidably adjustable therealong in a horizontal direction. The mounting of said sliding block 17 may be constituted by a T slot 18 in the face of the work table and a T clamp 19 associated with the sliding block 17 in known manner. The brackets 15, 15, 16 may be mounted on the sliding block 17 either way round, i. e. for operation of the switch 3 by movement of the table 2 in either direction selectively.

It will be understood that, for determining the cycle according to which the table 2 is to be moved, the sliding blocks 17 are adjusted to the required position and the brackets 15, 15, 16 are adjusted the required way round. There may, of course, be more dogs 1 than switches 3 because more than one say feed-left movement may be required in a given cycle.

Figure 3:
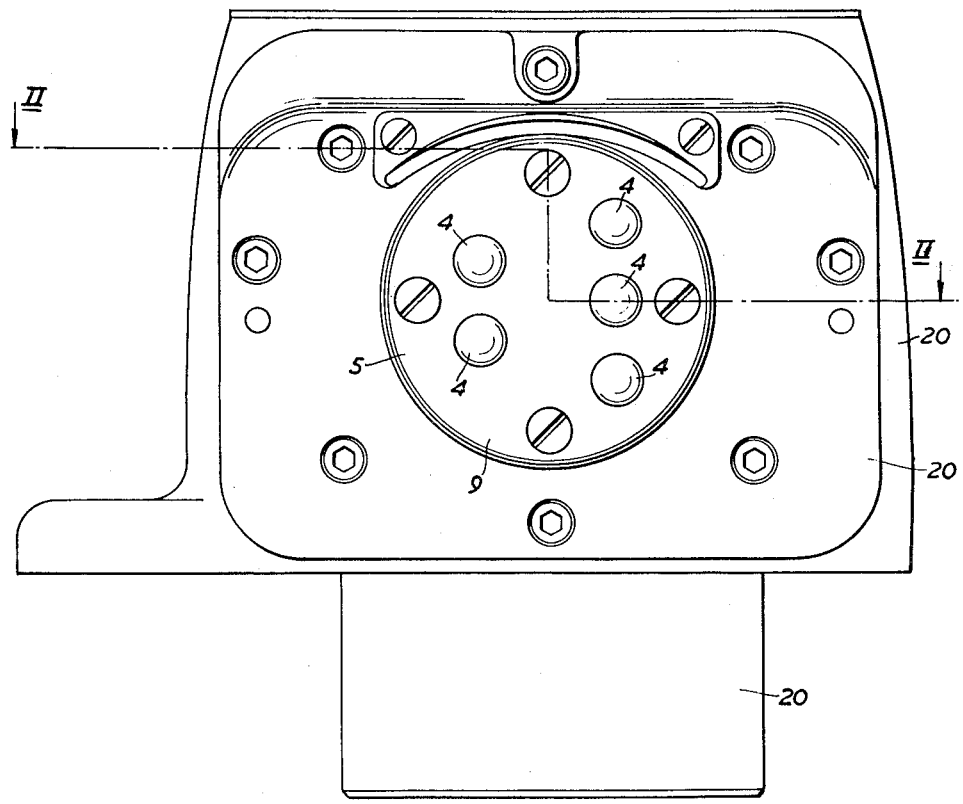
Figure 3 is an elevation, looking from the left of Figures 1 and 2, of the control switch structure.

In construction the carrier block 5 for the switches, which is circular as shown in Figure 3, is incorporated in a unit 20 which is mounted on a vertical stanchion 21, and, for the initial erection, may be adjusted up and down said stanchion to bring the balls 4 to the correct level in relation to the pawls 11 of the dogs 1.

The switches 3 are of the type whose plungers 6 require only a very small movement, say $10/1000$ of an inch or less, to actuate said switches from the normal to the operating position and vice versa. Thus, the response of said switches 1 can be correlated very accurately to the position of the table 2. The switch contacts (not seen in Figures 1, 2 and 3) are carried in known way by flat springs which click through a dead centre position to and from the normal and operating positions.

Describing now with reference to Figures 6A, 6B and 6C the electrical circuits by which the above functions are obtained, two reversing motors 22 and 23 are provided, one (22) for moving the table in either direction at feeding speed and the other (23) for moving it in either direction at quick-travel speed. The feed motor 22 is controlled by two contactors for forward and reverse, hereinafter termed the feed-left contactor FLC, and the feed-right contactor FRC. The quick travel motor 23 is also controlled by two contactors for forward and reverse, hereinafter termed the quick-travel-left contactor TLC and the quick-travel-right contactor TRC. The windings of these contactors will be hereinafter termed the feed-left winding, the feed-right winding, the quick-travel-left winding and the quick-travel-right winding.

Each of the feed-left, feed-right, quick-travel-left and quick-travel-right switches 3 has normal contacts which are closed when the switch is at its normal position, and operating contacts which are closed when the switch is at its operating position. Thus the feed-left switch has two contacts FL which are connected to conductor 24 at the normal position of the switch and two contacts AFL connected to said conductor 24 at the operating position of the switch. In like manner the feed-right switch has similarly functioning contacts FR and AFR; the quick-travel-left switch has similarly functioning contacts TL and ATL; and the quick-travel-right switch has similarly functioning contacts TR and ATR. Assuming the feed-left switch is actuated to its operating position, circuit is established from conductor 24 through its operating contacts AFL and the windings AFL$w$ of an auto feed-left relay to conductor 25. The auto feed-left relay accordingly closes its contacts AFL2 and thereby energises the winding FLC1 of the feed-left contactor, by a circuit extending from conductor 26 to conductor 27 and through other interlock contacts which will be described hereinafter. The feed-left contactor FLC accordingly closes and the table commences to move at feeding speed to the left. The auto feed-left relay has auxiliary contacts AFL1 which close upon closure of its main contacts AFL2, and a maintaining circuit for the winding AFL$w$ of said auto feed-left relay is established through the normal contacts FR of the feed-right switch and said auxiliary contacts AFL1 of the auto feed-left relay. Thus, when the feed-left switch returns to its normal position, opening its contacts AFL, the feed-left contactor FLC remains closed and the table continues to be fed to the left.

If now the feed-right switch is actuated to its operating position, contacts FR will be disconnected and the maintaining circuit for the winding AFL$w$ of the auto feed-left relay will be broken, and circuit for the winding AFR$w$ of an auto feed-right relay will be established through the operating contacts AFR of the feed-right switch. The auto feed-right relay accordingly closes its contacts AFR2 and thereby energises the winding FRC1 of the feed-right contactor FRC. The feed-right contactor FRC will therefore close and the table will move at feeding speed to the right. A maintaining circuit for the winding AFR$w$ of the auto feed-right relay is now established through the normal contacts FL of the feed-left switch and auxiliary contacts AFR1 on said auto feed-right relay. The table will therefore continue to be fed to the right after the feed-right switch has returned to the normal position opening its operative contacts AFR. It will be clear that if the feed-left switch is again actuated to the operating position the connections for feeding the table to the left will be again initiated and maintained.

The quick-travel-left and quick-travel-right switches control the windings TLC1 and TRC1 of the quick-travel-left and quick-travel-right contactors TLC and TRC through auto quick-travel-left and auto quick-travel-right relays having windings ATL$w$ and ATR$w$, main contactors ATL2 and ATR2, and auxiliary contacts ATL1 and ATR1, in precisely the same way as the feed-left and feed-right switches control the windings of the feed-left and feed-right contactors.

To take care of the case in which a change is required from one of the feeding movements to one of the quick-travel movements or vice versa, a feed relay with a winding F$w$ and normally closed contacts F, and a quick-travel relay with a winding T$w$ and normally closed contacts T are provided. The contacts F of the feed relay are in series with the windings AFL$w$ and AFR$w$ of both the auto feed-left and the auto feed-right relays, and the winding F$w$ of said feed relay is adapted to be connected in circuit, through the contacts ATL, ATR of either of the two quick-travel switches, when either of said quick-travel switches is at the operating position.

In like manner the contacts T of the quick-travel relay are in series with the windings ATL$w$, ATR$w$ of both the auto quick-travel-left and the auto quick-travel-right relays, and the winding T$w$ of said quick-travel relay is adapted to be connected in circuit, through the contacts AFL, AFR of either of the two feed switches, when either of said feed switches is at the operating position.

It will now be seen that, if the table is being fed say to the left and a quick-travel switch, say the quick-travel-right switch, is actuated to the operating position, the winding F$w$ of the feed relay will be instantly energised thereby opening the contacts F and breaking the maintaining circuit of the winding AFL$w$ of the auto feed-left relay and causing the auto feed-left relay and therefore the feed-left contactor FLC to fall out. The circuit for the winding ATRw of the auto quick-travel-right relay is established and the auto quick-travel-right relay closes thereby closing the quick-travel-right contactor TRC and the table is moved right at quick-travel speed.

The change from either quick-travel operation to either feed operation is precisely analogous.

The stop switch has normally closed contacts ST connected in series with all the circuits heretofore described from conductor 24 to the conductor 25. At its actuating position of the stop switch said contacts ST open so that all the contactors and relays are de-energised and the table is at a standstill. Said stop switch is operated to the actuating position to close the cycle, and the starting of a fresh cycle is effected under normal control as will hereinafter appear.

The movements of the work table, as well as being subject to automatic control to perform a given cycle as above described, can also be controlled manually, and a hand operated change-over switch is provided which closes contacts HC for hand operation and contacts AC for auto operation.

The hand operation is controlled by four push-button switches viz. a feed-left push-button switch FLPB, a feed-right push-button switch FRPB, a quick-travel-left push-button switch TLPB and a quick-travel-right push button switch TRPB. Each of these push-button switches has normally open contacts FLPB1, FRPB1, etc. which close upon depression and thereby complete circuit from conductor 26 through the winding FLC1 or FRC1, etc. of the corresponding feed-left, feed-right, quick-travel-left or quick-travel-right contactor to the conductor 27. In the case of the feed-left and feed-right push-button switches FLPB and FRPB, momentary depression only is sufficient to energise and maintain energised the corresponding windings FLC1 or FRC1, because each of the contactors FLC, FRC upon closing, closes maintaining contacts FLC3 or FRC3, which short circuit the normally open contacts FLPB1 or FRPB1 of the respective feed push-button switch.

Each of the push-button switches also has two normally closed contacts FLPB2 and FLPB3; FRPB2 and FRPB3, etc. which open upon depression, and it will be seen that each of the feed push-button switches has, in circuit with its normally open contacts FLPB1 and FRPB1, the normally closed contacts TLPB2, TRPB2 and FRPB2 or FLPB2 of the other three push-button switches, and each of the quick-travel push-button switches has, in circuit with its normally open contacts TLPB1 or TRPB1, the normally closed contacts FLPB3, FRPB3 and TRPB3 or TLPB3 of the other three push-button switches. Consequently whatever movement of the work table is taking place under manual control by any push-button, it can be immediately stopped by the depression of any other push-button. In the case where a feed movement is taking place following momentary depression of a feed push-button switch, depression of any other push-button switch will not only stop said feed movement but will substitute the movement called for by said other push-button switch. If however two push-buttons are depressed together nothing can happen as the circuit controlled by each must be interrupted by one of the normally closed contacts of the other.

Thus, by way of example, if the feed-left push-button switch is depressed, contacts FLPB1 will close and circuit will be established from conductor 26, through contacts TLPB2, TRPB2, said contacts FLPB1, contacts FRPB2, and winding FLC1 to conductor 27. Feed-left contactor FLC thereupon closes and energises feed-left motor 22 and the table is fed to the left. Contact FLC3 also closes, short circuiting contacts FLPB1 and the circuit is therefore maintained after the push-button is released.

When the feed-left movement of the table is completed the operator can depress the quick-travel-right push-button switch. This opens contact TRPB2 and causes the feed-left contactor to open. It also closes contact TRPB1, and thus establishes circuit from conductor 26, through contacts FLPB3, FRPB3, said contacts TRPB1, contacts TLPB3 and winding TRC1 to conductor 27. Contactor TRC therefore closes and motor 23 is energised for quick travel to the right. In this case the contacts TRPB1 are not short circuited, and therefore when the table has returned quickly to the loading position, the operator releases the quick-travel-right push-button switch and the table instantly stops.

The change-over switch for alternatively giving hand and auto control consists simply, as before stated, of a switch having contacts HC which it closes for hand and other contacts AC which it closes for auto. Closure of the auto contacts AC energises the winding CR1 of a relay having normally open contacts CR3 which when closed connect the aforesaid conductor 24 to one terminal of the secondary of a transformer 28 whose primary is energised from a source L1, L2, L3. The aforesaid conductor 25 is connected to the other terminal of said transformer secondary. Thus according as said contacts AC are closed or open, the whole auto control system heretofore described is rendered operative or inoperative.

The hand contacts HC of said change-over switch are connected as shown in the maintaining circuits of the windings FLC1 and FRC1 of both the feed-left and the feed-right contactors. One of the consequences of setting the change-over switch for auto is therefore that neither of the feed push-button switches can function to initiate maintained closure of the respective feed contactors.

It will be seen that the aforedescribed energisation of the winding FLC1 of the feed-left contactor FLC by the contacts AFL2 of the auto feed-left relay is through the normally closed contacts FRPB2 of the feed-right push-button switch FRPB, and therefore if the table is being fed left under auto control, depression of the feed-right push-button switch FRPB will stop this and will also set up feed-right so long as said push-button is depressed, but immediately it is released the feed-left will be resumed, unless in the meantime one of the dogs has operated.

In like manner the energisation of the winding FRC1 of the feed-right contactor FRC by the contacts AFR2 of the auto feed-right relay is through the normally closed contacts FLPB2 of the feed-left push-button FLPB, so the feed-left push-button switch exercises the equivalent control, when feeding right under auto conditions, to that of the feed-right push-button switch when feeding left under auto conditions.

When feeding left under auto conditions (i. e. with contact AFL2 closed), depression of the quick-travel-right push-button TRPB will not interrupt the circuit of the winding FLC1 of the feed-left contactor, and said quick-travel-right push-button TRPB will function, just as when the setting is for hand control and the contacts HC are closed, to energise the winding TRC1 of the quick-travel-right contactor. The quick-travel motor 23 and the feed motor 22 will both be running simultaneously. These motors are connected to the table through differential gearing in such a way that the quick-travel motor 23, owing to its greater speed, prevails, and the table is moved quickly to the right, despite the fact that the feed motor 22 is still running. Therefore when feeding left under auto conditions, depression of the quick-travel-right push-button switch TRPB will effect rapid withdrawal of the work piece from the cutting tool.

In precisely analogous manner, as will be clear from the drawing, when feeding right under auto conditions, depression of the quick-travel-left push-button switch will effect rapid withdrawal of the work piece from the cutting tool.

Depression of the quick-travel-left push-button switch TLPB when feeding left under auto control, or depression of the quick-travel-right push-button switch TRPB when feeding right under auto control does not however have any effect. This is because a feed-left relay has its winding FLR1 in parallel with the winding FLC1 of the feed-left contactor, and has normally closed contacts FLR4 in circuit with the winding TLC1 of the quick-travel-left contactor TLC, thus ensuring that the quick-travel-left contactor can never be closed while the feed-left contactor FLC is closed.

In like manner a feed-right relay has its winding FRR1 in parallel with the winding FRC1 of the feed-right contactor FRC, and has normally closed contacts FRR4 in the circuit of the winding TRC1 of the quick-travel-right contactor TRC, thus ensuring that the quick-travel-right contactor can never be closed while the feed-right contactor FRC is closed.

The contacts ATL2 of the auto quick-travel-left relay are simply in shunt with the normally open contacts TLPB1 of the quick-travel-left push-button switch TLPB, and the contacts ATR2 of the auto quick-travel-right relay are in shunt with the normally open contacts TRPB1 of the quick-travel-right push-button switch TRPB. Consequently, during quick travel in either direction under auto control, depression of any of the three push-button switches which appertain to a different movement will stop the existing quick-travel and supplant it by the movement appertaining to the depressed push-button switch. This latter movement only lasts as long as the push-button is depressed; when it is released the auto control will take over.

There are also the following further interlocks: a normally closed auxiliary contact FLC4 on the feed-left contactor FLC is in circuit with the winding FRC1 of the feed-right contactor, and a normally closed auxiliary contact FRC4 on the feed-right contactor FRC is in circuit with the winding FLC1 of the feed-left contactor, thus ensuring that in no circumstances can the two feed contactors be closed together.

In like manner a normally closed auxiliary contact TLC4 on the quick-travel-left contactor TLC is in circuit with the winding TRC1 of the quick-travel-right contactor TRC, and a normally closed auxiliary contact TRC4 on the quick-travel-right contactor TRC is in circuit with the winding TLC1 of the quick-travel-left contactor TLC thus ensuring that in no circumstances can the two quick-travel contactors be closed together.

When the change-over switch is first changed over to auto control (i. e. with the contacts AC closed), the table will remain stationary unless one of the dogs happens to be in engagement with its respective switch thereby closing one of the contacts AFL, AFR, ATL, ATR. To initiate the cycle, the appropriate one of the quick-travel push-button switches is depressed. This will start the table moving quickly in the appropriate direction, and, after this movement has caused one of the dogs to actuate its appropriate switch, said quick-travel push-button switch can be released and the cycle will carry on. Suppose the quick-travel-left push-button switch TLPB is depressed to bring the work piece leftwards up to the cutting tool. Just before the work piece reaches the tool the feed-left dog will engage the feed-left switch, thereby connecting contacts AFL to the conductor 24, and the feed-left contactor FLC will be closed as heretofore described, and, owing to the feed-left relay opening its contacts FLR4, the circuit of the winding TLC1 of the quick-travel-left contactor TLC will be de-energised and said quick-travel-left contactor will drop out. Then feed-left will carry on under auto control whether the quick-travel-left push-button switch TLPB is released or not. The work piece can never strike the tool at quick-travel rate.

A further feature of the invention is that the spindle of the machine can be arranged to run (a) when either the feed motor or the quick-travel motor is running or (b) only when the feed motor is running or (c) not at all.

Thus the spindle is driven by a motor 29 connected to the source L1, L2, L3 through a spindle contactor SC having a winding SC1. A selector switch S is provided having three positions viz. a first position at which all of three contacts S1, S2, S3 are connected together and therefore said winding SC1 is connected to all of four auxiliary normally open contacts FLCS, FRCS, TLCS, TRCS respectively on the feed-left, feed-right, quick-travel-left and quick-travel-right contactors FLC, FRC, TLC, TRC, so that closure of any one of said contactors effects energisation of said winding SC1 by connecting it across the conductors 26, 27; also a second position at which only the contacts S1 and S2 are connected together so that said winding SC1 is connected only to the contacts FLCS and FRCS, so that closure of only one of the feed contactors FLC or FRC effects energisation of said winding SC1; finally a third position at which none of the contacts S1, S2, S3 are connected together and the winding SC is therefore not connected to any of the contacts FLCS, FRCS, TLCS, TRCS. This last position enables the table to be operated through a complete automatic cycle while the spindle is at rest, which is useful when setting up.

The machine is provided with a stop signal lamp. This lamp is in circuit in series with two normally closed contacts NC1, NC2 on relays, the winding NC1w of one of which is connected to the two auxiliary contacts FLC5 and FRC5 on the feed contactors, so as to be energised during feeding, and the winding NC2w of the other of which is connected to the two auxiliary contacts TLC5 and TRC5 on the quick-travel contactors so as to be energised during quick travel. Thus during either feed or quick travel one of said windings NC1w and NC2w is energised and the stop lamp SL is accordingly deenergised. Immediately the cycle stops both said windings NC1w and NC2w are de-energised and the lamp SL lights up. The operator can be assured that when this lamp is illuminated no table movement is in operation.

The machine is used with a back-lash eliminator. It is desirable however that the elimination of back-lash should not apply during quick-travel movements. Accordingly a solenoid SN is employed which when de-energised releases the friction anchorage in the eliminator. A selector switch K is provided such that, when closed, the back-lash eliminator is in operation during feed movements only, and, when open, said back-lash eliminator is cut out during all movements. This last is because back-lash elimination is unnecessary except when climb milling.

Normally the conductor 26, and therefore the whole hand control system is cut off from the source of power (i. e. the transformer 28) owing to the winding NV1 of a relay being de-energised and contacts NV5 on said relay accordingly being open. When it is wished to initiate hand control a normally open prepare-start push-button PPB is depressed and closed and thereby said winding NV1 is energised. Said winding NV1, upon energisation, also closes contacts NV3 in shunt with said push-button PPB, so that said winding will remain energised after said push-button is released. To terminate hand control, a normally closed stop push-button SPB in circuit with said winding NV1 is depressed and opened, and thereby said winding is de-energised and remains de-energised owing to opening of contacts NV3.

Dealing now with a few further details of the electrical circuits, the reference ULR designates an ultimate limit switch for limiting movement of the table to the right, and the reference ULL designates a similar limit switch for limiting movement of the table to the left. It will be seen that the switch ULR is connected in circuit with the windings FRC1 and TRC1 of the feed-right and traverse right contactors so that when said switch ULR opens upon the table reaching its right-hand limit further movement to the right is impossible. In like manner switch ULL is in circuit with windings FLC1 and TLC1 and thus prevents movement of the table beyond the left-hand limit.

The reference SR designates a reversing switch for the spindle motor 29.

The reference FZ designates fuses. The reference OLw designates overload windings and the reference OL the corresponding overload contacts.

Figure 4:
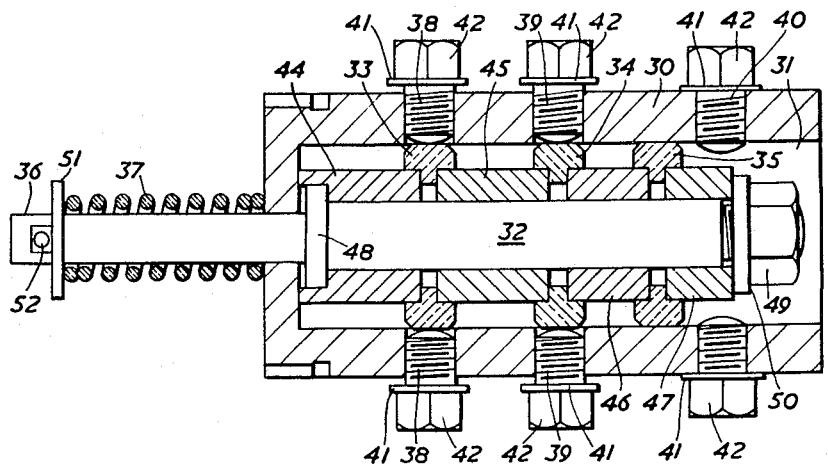
Figure 4 is a sectional elevation of a push button employed in the apparatus.
Figure 5:
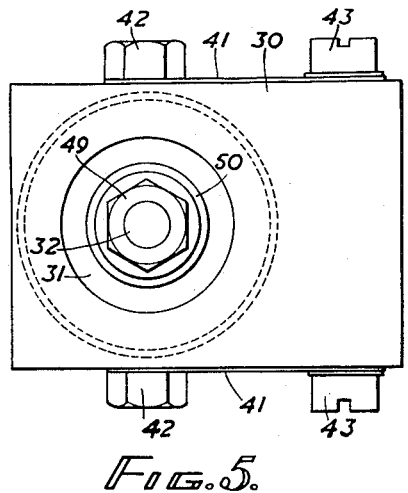
Figure 5 is an end elevation of the same looking from the right of Figure 4.

As described heretofore, each of the push-button switches has two normally closed contacts and one normally open contact. In practice, as shown in Figures 4 and 5, the switch comprises a block 30 of insulating material with a cylindrical bore hole 31 in it. A metal plunger rod 32 is provided which is located axially within this bore hole 31 and which extends at one end to the outside of the block 30. Said plunger rod 32 has mounted concentrically upon it, with insulation in between, as will hereinafter appear, three contacts 33, 34 and 35 each in the form of a ring. These ring contacts are spaced at intervals along the plunger rod 32 within the bore hole 31 and their outer peripheries engage the inner periphery of said bore hole, and thus said ring contacts keep the plunger rod axially aligned in the bore hole. Said plunger rod is axially reciprocable in said bore hole. It is moved to one end of its travel by pressure on a push knob 36 on its end outside the block and is biased by a spring 37 to a normal limiting position at the other end of its travel.

Three pairs of relatively stationary contacts 38, 39, 40 are provided for co-operating with the respective ring contacts 33, 34, 35. The stationary contacts of each pair are diametrically opposite to each other with respect to the axis of the plunger rod and are mounted as shown in radial holes in the wall of the block 30, their outer ends extending to the outside of said block. They are inwardly biased as will hereinafter appear to limiting positions at which their inner ends project a little way into the bore hole 31. Their inner ends are rounded as shown and the outer peripheries of the ring contacts 33, 34, 35 are of rounded cross-section.

At the normal position of the plunger rod 32, the two ring contacts 33 and 34 nearest the push knob 36 bridge their respective pairs 38 and 39 of relatively stationary contacts, while the ring contact 35 furthest from the push knob is clear of its respective pair 40 of relatively stationary contacts. When the plunger rod 32 is pressed to its other limit, the ring contacts 33 and 34 are clear of their respective pairs 38 and 39 of stationary contacts, while the ring contact 35 engages its respective pair 40 of relatively stationary contacts. It will be seen that each ring contact, when engaging with a relatively stationary contact, presses the latter outwards by a cam action in opposition to its bias and thus good contact is ensured.

In construction, the block 30 of insulating material is of rectangular section and the circular section of the bore hole 31 is towards one end of the rectangular section. The radial holes for the relatively stationary contacts 38, 39, 40 pass from the bore hole to the side faces of the block. These radial holes are circular and the contacts are cylindrical and fit slidably in said holes. Each contact at its outer end terminates in a reduced screw-threaded shank, not seen, and this passes through a hole in one end of a leaf spring 41, and the contact is secured to said leaf spring by means of a nut 42 screwed onto said screw-threaded shank. The other end of the leaf spring is secured by means of a screw 43 against the side face of the block near the other end of the rectangular section. The leaf spring 41 serves as the means for inwardly biasing the contact, the inward limit being determined by the leaf spring resting flush against the side face of the block.

The bore hole 31 of the block at its end nearest the push knob is closed except for a hole large enough to give passage to the plunger rod 32. At the other end said bore hole may be open.

For mounting the ring contacts on the plunger rods, four short insulating locating sleeves 44, 45, 46, 47 are mounted on said plunger rod, and the three ring contacts 33, 34, 35 are mounted on the outside of said sleeves and are formed as shown with circumeferential ridges on their inner peripheries which project into the spaces between said sleeves. The sleeves are clamped together between a collar 48 formed on the plunger rod and a nut 49 screwed on the end of said plunger rod, with a washer 50 between it and the sleeve 47, and thus the ridges on the contact rings are gripped between the sleeves and are rigidly located with respect to the plunger rod at spaced intervals therealong.

For biasing the plunger rod to its said normal position the spring 37, coiled about the portion of said plunger rod outside the block 30 is in compression between said block and a washer 51 maintained on said plunger rod by means of a split pin 52. For limiting said plunger rod at its normal position either the said collar thereon, or a flange surrounding said collar on the adjacent locating sleeve 44, abuts against the closed end of the bore hole 31 in the block.

It will be seen that the movement provides a wiping contact. It will also be seen that the plunger rod 32 together with the spacing sleeves 44, 45, 46, 47 and contact rings 33, 34, 35 mounted thereon, are free to rotate relative to the block. A certain amount of such rotation tends to take place in use so that new contact surfaces of the contact rings are continually brought into use. Independent means are provided to prevent the push knob itself from turning.

I claim:

1. An electrical control apparatus, comprising a driven device which travels in reverse directions in a given path, two separate reversing electric motors operatively connected to said driven device for driving the same, one of said motors being adapted to give a slow drive and the other a quick drive, four electric switches mounted adjacent to said driven device, each having a normal position and an operative position, one of said switches, when momentarily actuated to its operative position, being adapted to initiate a maintained circuit for driving the slow drive motor in one direction, another of said switches, when momentarily actuated to its operative position, being adapted to initiate a maintained circuit for driving said slow drive motor in the opposite direction, the third of said switches, when momentarily actuated to its operative position, being adapted to drive the quick drive motor in one direction, and the fourth of said switches, when momentarily actuated to its operative position, being adapted to drive the quick drive motor in the other direction, four dogs corresponding to the respective switches mounted on said driven device and each adapted to actuate its corresponding switch momentarily to the operative position upon said driven device reaching a given position when travelling in a given direction, and interlocks whereby, the establishment of one of said maintained circuits effects the disestablishment of other of said maintained circuits.

2. An electrical control apparatus, comprising a driven device which travels in reverse directions in a given path, a reversing electric motor operatively connected to said driven device for driving the same, two electric switches mounted adjacent to said driven device, each having a normal position and an operative position, one of said switches, when momentarily actuated to its operative position, being adapted to initiate a maintained circuit for driving said motor in one direction, and the other of said switches when momentarily actuated to its operative position, being adapted to initiate a maintained circuit for driving said motor in the other direction, interlocks whereby establishment of each maintained circuit effects disestablishment of the other, two dogs, corresponding to the respective switches mounted on said driven device, and each adapted to actuate its corresponding switch momentarily to the operative position upon said driven device reaching a given position when travelling in a given direction, a change-over switch, said change-over switch having an auto position at which it permits said switches to initiate said maintained circuits and a hand position at which it prevents said switches from initiating said maintained circuits, two hand switches, each having a normal position and an operative position, one of said hand switches, when actuated to its operative position, being adapted to establish a circuit for driving said motor in one direction, and the other hand switch, when actuated to its operative position, being adapted to establish a circuit for driving said motor in the other direction, maintaining contacts on said change-over switch adapted, when closed to establish a maintaining circuit for either of said last named circuits, said maintaining contacts being closed only when said change-over switch is at the hand position.

3. An electrical control apparatus, comprising a driven device which travels in reverse directions in a given path, a reversing electric motor operatively connected to said driven device for driving the same, two electric switches mounted adjacent to said driven device, each having a normal position and an operative position, one of said switches, when momentarily actuated to its operative position, being adapted to initiate a maintained circuit for driving said motor in one direction, and the other of said switches when momentarily actuated to its operative position, being adapted to initiate a maintained circuit for driving said motor in the other direction, interlocks whereby establishment of each maintained circuit effects disestablishment of the other, two dogs, corresponding to the respective switches mounted on said driven device, and each adapted to actuate its corresponding switch momentarily to the operative position upon said driven device reaching a given position when travelling in a given direction, a change-over switch, said change-over switch having an auto position at which it permits said switches to initiate said maintained circuits and a hand position at which it prevents said switches from initiating said maintained circuits, two hand switches each having a normal position and an operative position, and each having normally open contacts and normally closed contacts, one of said hand switches, when actuated to its operative position being adapted to establish, by way of its normally open contacts, a circuit for driving said motor in said one direction, and to disestablish, by way of its normally closed contacts, the maintained circuit, if such is established, for driving said motor in said other direction, and the other hand switch, when actuated to its operative position, being adapted to establish, by way of its normally open contacts, a circuit for driving said motor in said other direction, and to disestablish, by way of its normally closed contacts, the maintained circuit, if such is established, for driving said motor in said one direction, maintaining contacts on said change-over switch adapted, when closed, to establish a maintaining circuit for either of said circuits established through said normally open contacts of said hand switches, said maintaining contacts being closed only when said change-over switch is at the hand position.

4. An electrical control apparatus, comprising a driven device which travels in reverse directions in a given path, a reversing electric motor operatively connected to said driven device for driving the same, two electric switches mounted adjacent to said driven device, each having a normal position and an operative position, one of said switches, when momentarily actuated to its operative position, being adapted to initiate a maintained circuit for driving said motor in one direction, and the other of said switches, when momentarily actuated to its operative position, being adapted to initiate a maintained circuit for driving said motor in the other direction, interlocks whereby the establishment of each of said maintained circuits effects disestablishment of the other, two dogs, corresponding to the respective switches, mounted on said driven device, and each adapted to actuate its corresponding switch momentarily to the operative position upon said driven device reaching a given position when travelling in a given direction two hand switches each having a normal position and an operative position, and each having normally open contacts and normally closed contacts, one of said hand switches, when actuated to its operative position being adapted to establish, by way of its normally open contacts, a circuit for driving said motor in said one direction, and to disestablish, by way of its normally closed contacts, the maintained circuit, if such is established, for driving said motor in said other direction, and the other hand switch, when actuated to its operative position, being adapted to establish, by way of its normally open contacts, a circuit for driving said motor in said other direction, and to disestablish, by way of its normally closed contacts, the maintained circuit, if such is established, for driving said motor in said one direction.

5. An electric control apparatus, comprising a driven device which travels in reverse directions in a given path, two separate reversing electric motors, differential gearing connecting said motors to said driven device whereby one of said motors is adapted to drive said driven device slowly and the other is adapted to drive said driven device quickly, an electric switch mounted adjacent to said driven device, said switch having a normal position and an operative position, means whereby, upon momentary actuation of said switch to its operative position, a maintained circuit is initiated for driving said slow-drive motor for movement of said driven device in one direction, a dog adapted to actuate said switch momentarily to said operative position upon said driven device reaching a given position when travelling in a driven direction, a hand switch having a normal position and an operative position, and means whereby, upon actuation of said hand switch to the operative position, a circuit is established for said quick-drive motor for movement of said driven device in the other direction, said maintained circuit remaining established for driving the slow drive motor, while said circuit for driving the quick-drive motor is also established, so that both motors run together while said hand switch is at its operative position, and the quick-drive motor prevails to drive the driven device quickly in said other direction, and said slow-drive motor alone runs when the hand switch returns to its normal position, whereby the slow-drive of said driven device in said one direction is resumed.

6. An electric control apparatus, comprising a driven device which travels in reverse directions in a given path, two separate reversing electric motors, differential gearing connecting said motors to said driven device whereby one of said motors is adapted to drive said driven device slowly and the other is adapted to drive said driven device quickly, four electric switches mounted adjacent to said driven device, each having a normal position and an operative position, one of said switches, when momentarily actuated to its operative position, being adapted to initiate a maintained circuit for driving the slow drive motor in one direction, another of said switches, when momentarily actuated to its operative position, being adapted to initiate a maintained circuit for driving said slow drive motor in the opposite direction, the third of said switches, when momentarily actuated to its operative position, being adapted to drive the quick drive motor in one direction, and the fourth of said switches, when momentarily actuated to its operative position, being adapted to drive the quick drive motor in the other direction, four dogs corresponding to the respective switches mounted on said driven device and each adapted to actuate its corresponding switch momentarily to the operative position upon said driven device reaching a given position when travelling in a given direction, interlocks whereby, the establishment of one of said maintained circuits effects the disestablishment of other of said maintained circuits, a change-over switch, said change-over switch having an auto position at which it permits said swtiches to initiate said maintained circuits and a hand position at which it prevents said swtiches from initiatng said mantained circuits, four hand switches each having a normal position and an operative position, means whereby, with said change-over switch at said hand position, two of said hand switches, upon actuation to their operative positions, establish driving connections for the slow drive motor in reverse directions respectively, and the other two of said hand swtiches, upon actuation to their operative positions, establish driving connections for the quick drive motor in reverse directions respectively, means whereby, with said change-over switch at the auto position, and said maintained circuit established for energising said slow drive motor for driving said driven device in said one direction, upon actuation of the hand switch for energising said quick drive motor for driving said driven device in said other direction, said quick-drive motor is energised simultaneously with the energisation of said slow drive motor, so that both motors run together while said hand switch is at its operative position, and the quick-drive motor prevails to drive the driven device quickly in said other direction, and said slow drive motor alone runs when the hand switch returns to its normal position, whereby the slow drive of said driven device in said one direction is resumed.

7. An electric control apparatus, comprising a driven device which travels in reverse directions in a given path, two separate reversing electric motors operatively connected to said driven device for driving the same, one of said motors being adapted to drive said driven device slowly and the other being adapted to drive said driven device quickly, an electric switch mounted adjacent to said driven device, said switch having a normal position and an operative position, means whereby, upon momentary actuation of said switch to its operative position, a maintained circuit is initiated for driving said quick drive motor for movement of said driven device quickly in one direction, a dog adapted to actuate said switch momentarily to said operative position upon said driven device reaching a given position when travelling in a driven direction, a hand switch having a normal position and an operative position, and means whereby, upon actuation of said hand switch to said operative position, said maintained circuit is interrupted, and a circuit is established for driving said slow drive motor for movement of said driven device in the other direction, and upon return of said hand switch to said inoperative position, said maintained circuit is re-established, and said circuit for driving said slow drive motor is interrupted.

8. An electrical control apparatus, comprising a driven device which travels in reverse directions in a given path, a reversing electric motor operatively connected to said driven device for driving the same, an electric switch mounted adjacent to said driven device, said switch having a normal position and an operative position, and being adapted, when momentarily actuated to its operative position, to initiate a maintained circuit for driving said motor in one direction, a dog mounted on said driven device and adapted to actuate said switch momentarily to the operative position upon said driven device reaching a given position when travelling in a given direction, a change-over switch, said change-over switch having an auto position at which it permits said switch to initiate said maintained circuit, and a hand position at which it prevents said switch from initiating said maintained circuit, a hand switch having a normal position and an operative position, and having normally open and normally closed contacts and means whereby, upon actuation of said hand switch to the operative position, said normally closed contacts open to interrupt said maintained circuit if it is established, and said normally open contacts close to establish a circuit for driving said motor in the other direction, and maintaining contacts on said change-over switch, through which when said maintaining contacts are closed said circuit for driving said motor in said other direction is adapted to be maintained, said maintaining contacts being closed only when said change-over switch is at said hand position.

9. An electric control apparatus, comprising a driven device which travels in reverse directions in a given path, two separate reversing electric motors, operatively connected to said driven device for driving the same, one of said motors being adapted to give a slow drive and the other a quick drive, an electric switch mounted adjacent to said driven device, said switch having a normal position and an operative position, means whereby, upon momentary actuation of said switch to its operative position, a maintained circuit is initiated for driving said slow drive motor for movement of said driven device in one direction, a dog corresponding to said switch mounted on said driven device and adapted to actuate said switch momentarily to said operative position, upon said driven device reaching a given position when travelling in a given direction, a change-over switch, said change-over switch having an auto position at which it permits said switch to initiate said maintained circuit, and a hand position at which it prevents said switch from initiating said maintained circuit, a hand switch having a normal position and an operative position, means whereby, when said change-over switch is at the auto position and said maintained circuit is not established, operation of said hand switch to the operative position establishes a circuit for driving said quick drive motor for movement of said driven device in the said one direction, means whereby, when said change-over switch is at the auto position and said maintained circuit is established, operation of said hand switch to the operative position is without effect, and means whereby, when said change-over switch is at the hand position, operation of said hand switch to the operative position establishes a circuit for driving said quick drive motor for driving said quick drive motor in said one direction.

References Cited in the file of this patent

UNITED STATES PATENTS

| | | |
|---|---|---|
| 2,361,212 | King | Oct. 24, 1944 |
| 2,370,701 | Woodbury | Mar. 6, 1945 |
| 2,544,652 | Borchardt | Mar. 13, 1951 |
| 2,561,346 | De Vlieg et al. | July 24, 1951 |